May 22, 1956
H. N. ROGERS
2,746,197
FISHING DEVICE
Filed May 8, 1953
2 Sheets-Sheet 1
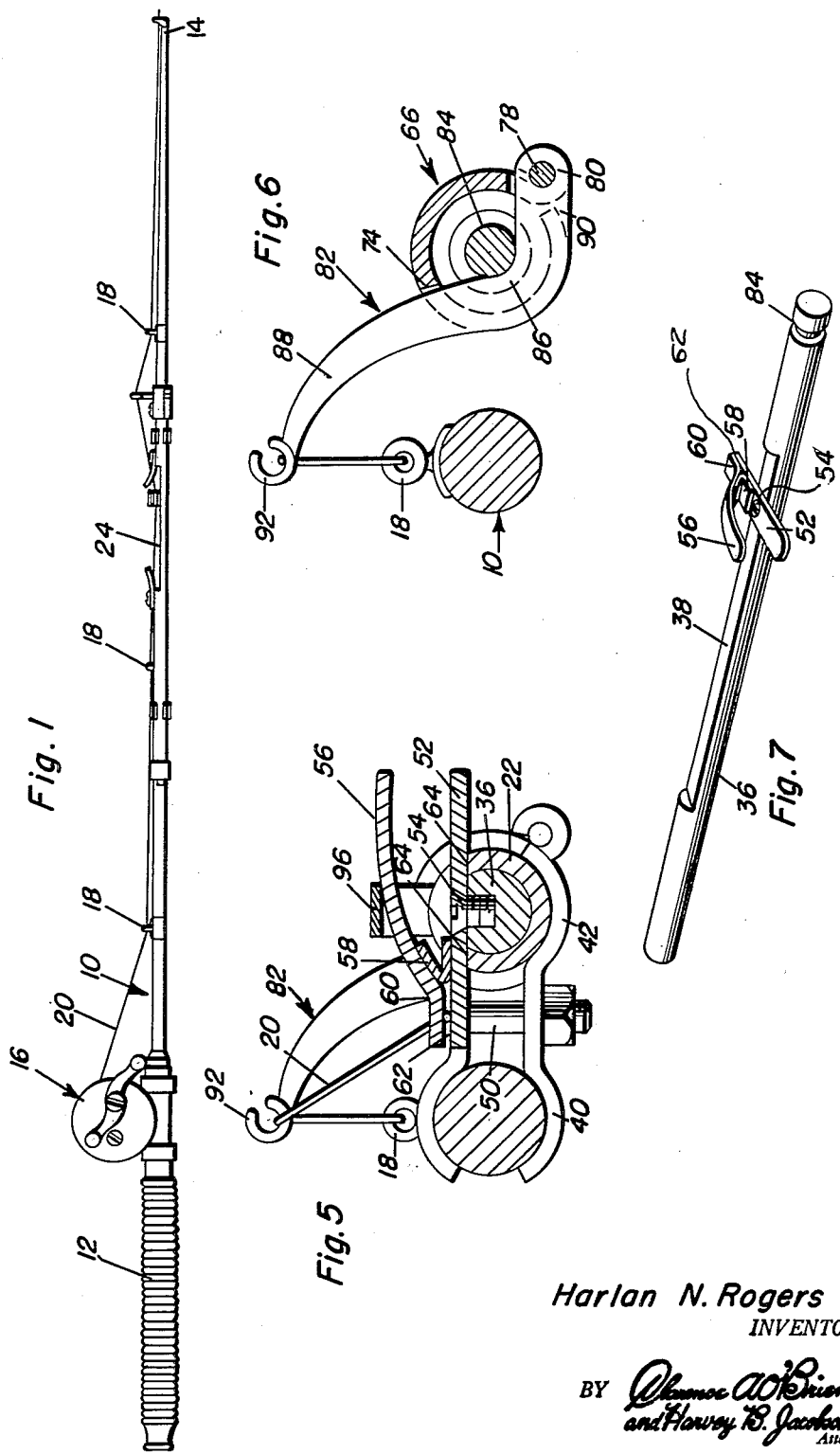
Harlan N. Rogers
INVENTOR.

May 22, 1956     H. N. ROGERS     2,746,197
FISHING DEVICE
Filed May 8, 1953     2 Sheets-Sheet 2
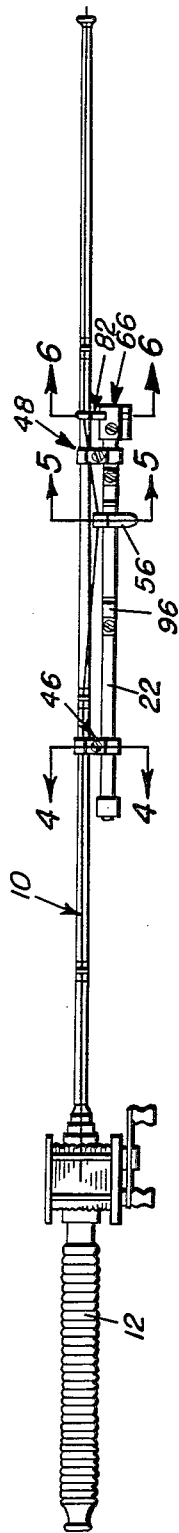
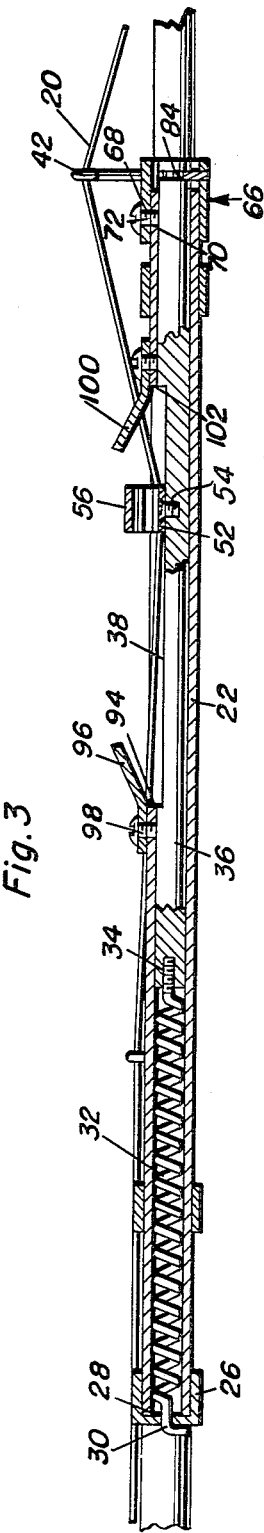
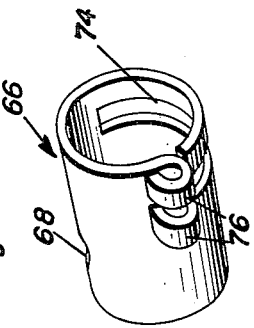
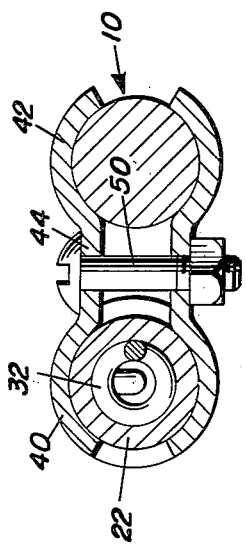
Harlan N. Rogers
INVENTOR.
BY United States Patent Office 2,746,197
Patented May 22, 1956

2,746,197

FISHING DEVICE

Harlan N. Rogers, Jamestown, Ky., assignor of fifty per cent to Hobert J. Carnes, Jamestown, Ky.

Application May 8, 1953, Serial No. 353,720

3 Claims. (Cl. 43—15)

This invention relates generally to fishing devices, and pertains more particularly to an attachment for fishing rods for hooking fish.

A primary object of this invention is to provide an attachment for fishing rods which will most effectively simulate the expert manipulation of fish line for firmly hooking a fish after the bait has been initially taken, thus enabling inexpert persons such as children and novices to hook a fish in as efficient a manner as an expert fisherman.

Another object of this invention is to provide a fishing device in conformity with the foregoing object which includes means for releasing the fish line once the hooking operation has been performed to permit subsequent playing and bringing in of the fish in the normal and conventional manner.

Another object of this invention is to provide a fishing device constructed not only in accordance with the foregoing objects, but also to allow immediate release of the fish line no matter what type of strike by a fish is effected on the line.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a fishing pole with the device attached, showing the general arrangement of parts;

Figure 2 is a plan view of the assembly shown in Figure 1;

Figure 3 is an enlarged vertical sectional view taken through the fishing device and showing a portion of the fishing rod to which it is attached;

Figure 4 is a transverse section taken substantially along the plane of section line 4—4 of Figure 2, showing details of the assembly on an enlarged scale;

Figure 5 is another transverse sectional view taken substantially along the plane of section line 5—5 of Figure 2, showing the fish line clamp mechanism;

Figure 6 is another enlarged transverse sectional view taken substantially along the plane of section line 6—6 of Figure 2 showing the trigger mechanism;

Figure 7 is a perspective view of the plunger and clamping assembly; and

Figure 8 is a perspective view of the trigger sleeve.

Referring now more particularly to the drawings, reference numeral 10 indicates generally a conventional fishing rod which includes the handle portion 12 and the tip 14 and which is provided with the reel assembly 16 and guide eyes 18 disposed in alignment in longitudinally spaced points along the fishng rod. Fish line 20 is wound upon the reel assembly 16 and extends through the guide eyes 18 in a well known manner.

Referring now more particularly to Figures 3 and 4, the fishing device comprises an elongated guide tube 22 which is provided with an intermediate cut-away portion 24 and one end of which is provided with a cap 26 which is apertured centrally as at 28 to receive the laterally bent end 30 of the tension spring 32. The other end of the tension spring is threadedly engaged, as at 34, in the rearward end of the plunger 36, which plunger is provided with the cut-away portion 38. The guide member 22 is clampingly secured to the fishing rod 10 by means of bracket assemblies which include bracket plates having arcuately formed end portions 40 and 42 interconnected by the intermediate apertured flat portions 44, two pairs of these members being provided for securing the device to a fishing rod, as indicated generally by the reference characters 46 and 48. The fastening members 50 secure each pair of bracket members to the guide member 22 and the fishing rod 10, respectively, as will be seen.

As seen in Figure 7, the plunger 36 carries a clamping plate 52 transversely thereof adjacent the forward end of the cut-away portion 38, such plate being secured thereto by the fastening element 54. Clamping lever 56 is hingedly secured to the clamping plate by the angulated spring member 58 whose opposite end portions are secured, respectively, to an intermediate portion of the clamping lever and an intermediate portion of the clamping plate, so that the jaw portion 60 of the clamping lever is normally urged into engagement with the anvil portion 62 of the clamping plate. It will be noted that the clamping plate 52 engages on its undersurface with the opposed edges of the guide member 22 formed by the cut-away portion thereof, as indicated by the reference character 64.

As seen most clearly in Figures 3 and 8, a trigger sleeve 66 is telescopically received on the forward end of the guide member 22 and is provided with the aperture 68 registered with a threaded aperture 70 in the guide member for receiving the fastening element 72 securing the trigger sleeve to the member 22, in the manner shown, with the forward end of the trigger sleeve extending beyond the forward end of the guide member. The sleeve is provided with an elongated circumferential opening 74 and a portion of its body is deformed in the manner shown to provide the spaced journal eye 76 receiving the pivot pin 78 which extends through the apertured end portion 80 of the trigger assembly 82 to pivotally secure the same thereto. The forward end of the plunger 36 is provided with the annular groove 84 within which the curved locking portion 86 of the trigger is received, the free end portion 88 of the trigger extending generally at right angles to the shank portion 90 thereof and terminating in the split eye 92.

In operation, the plunger member is urged to the position as shown in Figure 3 wherein the annular groove portion 84 thereof is engaged by the trigger 82 to maintain the plunger in this position against the action of the tension spring 32. The fish line 20 is engaged within the eye portion 92 of the trigger and a portion of the fish line is clamped between the clamping lever and the clamping plate. It will be manifest that should a fish subsequently strike the bait disposed at the free end of the fish line 20, such action by the fish will tend to straighten the fish line into alignment with the guide eyes 18 on the fishing rod, which will effect a pivotal motion of the trigger 82 inasmuch as the eye portion 92 thereof is disposed vertically above the guide eyes 18 of the fishing rod, this pivotal action of the trigger releasing the plunger 36 whereby the tension spring 32 will urge the fish line clamping assembly rearwardly toward a position in abutment with the shoulder portion 94 formed by the cut-away portion in the tubular member 22. This, of course, will effect a jerking on the fish line which will firmly engage the hook within the fish's mouth.

An angularly extending trip plate 96 is secured by the fastener 98 adjacent the shoulder portion 94 of the tubular member, and it will be noted that this trip plate is disposed within the path of movement of the clamping lever 56 so that the action of the tension spring 32 will effect a pivotal movement of the jaw portion 60 away from the anvil portion 62 to release the fish line 20, this action occurring subsequent to the hooking of the fish. Inasmuch as the jaw and anvil portions 60 and 62, respectively, are disposed laterally out of alignment with the guide eyes 18 of the fishing rod, there is no danger of the fish line being snagged after it has once been released from the clamping assembly.

Under some circumstances, a fish may strike so suddenly and strongly against the bait as to jerk the plunger assembly 36 forwardly with respect to the tubular member 22, in which case, the clamping lever 56 will be engaged by the angulated trip plate 100 secured adjacent the forward shoulder 102 of the tubular member 22.

It is to be appreciated that the above described fishing device permits even the most inexperienced person to effectively hook a fish so that he may subsequently play and bring the fish in, in a conventional and well known manner.

It is also to be noted that the trigger 82 may be disposed more or less in the sleeve opening 74 to effect less or more hair trigger action of the same, the particular setting being left to the discretion of the individual operator.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A fishing device comprising an elongated tubular member, a plunger slidably received in said tubular member and movable between forward and rear positions, spring means for urging said plunger to the rear position, trigger means for releasably holding said plunger in an intermediate position, a fish line clamp carried by said plunger, means on said tubular member in the path of movement of said clamp for releasing a fish line held thereby when said plunger is urged to its rear position, and means on said tubular member in the path of movement of said clamp for releasing a fish line held thereby when said plunger is moved to the forward position.

2. A fishing rod attachment comprising an elongated tubular member having a cut-away portion intermediate its end and open at at least one end, a plunger housed and slidably mounted in said tubular member and movable between intended forward and rear positions with respect to said tubular member, spring means connected at one end with said plunger and at its opposite end with the adjacent complemental end of said tubular member, said spring means serving to urge said plunger to its rear position, the end of said plunger adjacent to the open end of said tubular member being provided with an annular groove, a trigger, means pivotally mounting the trigger for operation on the open-ended portion of said tubular member, said trigger having a portion releasably engageable with said groove and said trigger having a free end portion provided with a fishing line accommodating eye, a fish line clamp carried by said plunger and operable in said cut-away portion, and means on said tubular member in the path of movement of said clamp for releasing a fish line held thereby when said plunger is urged to its rear position.

3. A fishing device comprising an elongated tubular member having a cut-away portion intermediate its ends, said tubular member being open at one end and provided with a closing cap at the opposite end, a trigger-latch pivotally supported from the open-ended portion of said tubular member, a plunger slidably confined in said tubular member and movable between forward and rearward positions, spring means also confined for operation in said tubular member and connected at one end with said cap and at its opposite end with the corresponding end of said plunger for urging said plunger to the rearward position, a fish line clamp carried by the intermediate portion of the plunger and operable in the cut-away portion of said tubular member, the end of said plunger adjacent the open end of said tubular member having an annular keeper groove therein and a portion of said trigger latch being releasably engageable with said trigger groove and also being provided with a fishing line eye, said clamp comprising a plate secured to said plunger, a lever member hingedly mounted on said plate and having a jaw portion engageable with said plate, resilient means secured to said plate and an intermediate portion of said lever for urging said jaw portion into engagement with said plate, and an angularly disposed trip plate fixed on said tubular member at one end of said cut-away portion and situated in the path of movement of an end of said lever member in a manner to trip the lever member and to open the clamp in a manner to release that portion of the fishing line which is cooperable with said clamp.

References Cited in the file of this patent

UNITED STATES PATENTS

| | | |
|---|---|---|
| 657,518 | Cook | Sept. 11, 1900 |
| 1,709,436 | Koester | Apr. 16, 1929 |
| 1,747,033 | Shireman | Feb. 11, 1930 |
| 2,657,493 | Coles | Nov. 3, 1953 |